June 25, 1963  D. C. HUBBARD ETAL  3,095,223
WIRE CLAMP
Filed March 3, 1961  2 Sheets-Sheet 1
FIG. 1
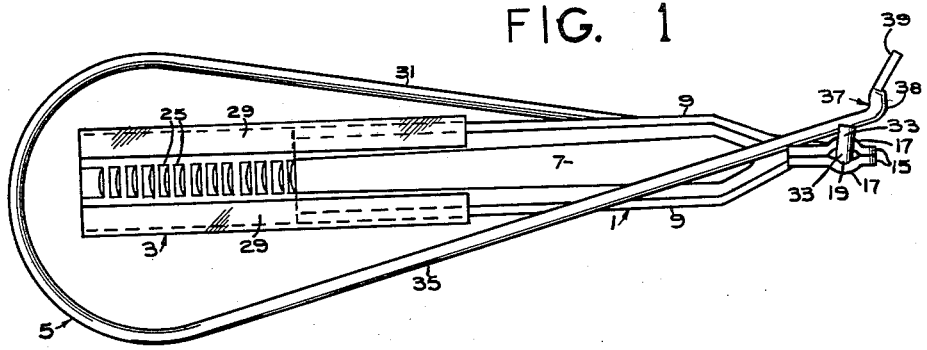
FIG. 2
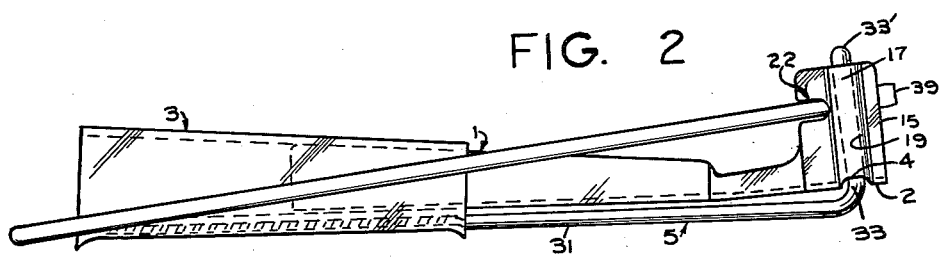
FIG. 3
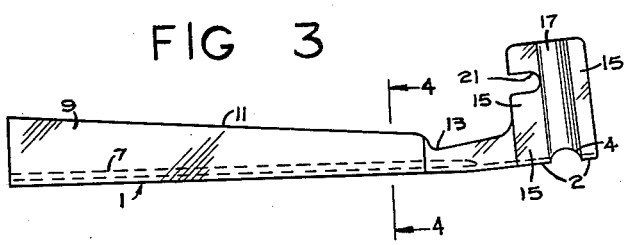
FIG. 4
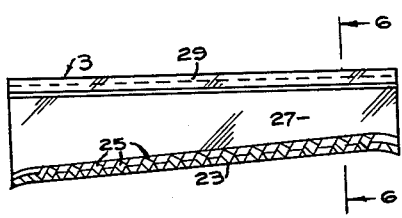
FIG. 6
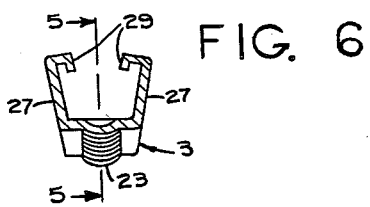
FIG. 5
INVENTORS
David C. Hubbard
Harry R. Weitkemper
BY
William D. Harris, Jr.
Attorney June 25, 1963 D. C. HUBBARD ETAL 3,095,223
WIRE CLAMP
Filed March 3, 1961 2 Sheets-Sheet 2

INVENTORS
David C. Hubbard
Harry R. Weitkemper
BY
William D. Harris, Jr.
Attorney United States Patent Office 3,095,223
Patented June 25, 1963

3,095,223
WIRE CLAMP
David C. Hubbard and Harry R. Weitkemper, Centralia, Mo., assignors to A. B. Chance Company, Centralia, Mo., a corporation of Missouri
Filed Mar. 3, 1961, Ser. No. 93,136
3 Claims. (Cl. 287—83)

This invention relates to wire clamps, and with regard to certain more specific features, to a bail-supported wedge clamp for supporting lead-in conductors and the like from supports such as insulators.

Application Serial Number 788,143, now Patent No. 3,009,720, in the name of Weitkemper and Coyle, filed January 21, 1959, assigned to our present assignee and co-pending herewith, is directed to a bail-supported wedge clamp. The present invention is for certain improvements to the invention described in said co-pending application. More particularly, it covers improved features that greatly simplify the latching and unlatching of the bail member of such a wedge clamp.

Among the several objects of the invention may be noted the provision of an improved reusable conductor wedge clamp which will withstand large loads without deforming the wedge clamp so as to make it inoperative for re-use; the provision of an attachment between wedge and bail parts which may be simply latched into a secure holding position by using only one hand and which directs a large part of the bail holding force in line close to the axis of pull of the conductor; the provision of a wedge clamp and bail assembly of the class described which is adapted to permit the bail to be pivoted with respect to the wedge into a tangle-free, self-protecting bundle from which pieces cannot be lost or entangled with one another, yet which will allow the bail, when the wedge clamp is in its operative position for installation, to be securely latched by a simple snap action that requires no rotative movement or complicated manipulation; and the provision of a simple, three piece clamp of the class described which reduces the amount of material employed and which may be economically produced. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is a plan view of the wire clamp in nontangling position for packaging and shipment;

FIG. 2 is a side elevation of FIG. 1;

FIG. 3 is a side elevation of an inner wedge member shown on FIGS. 1 and 2;

FIG. 4 is a cross section taken on line 4—4 of FIG. 3;

FIG. 5 is an axial section of an outer wedge member shown in FIGS. 1 and 2, being viewed on line 5—5 of FIG. 6.

FIG. 6 is a cross section taken on line 6—6 of FIG. 5;

Corresponding reference characters indicate corresponding parts throughout the several views of the drawings.

Figure 7:
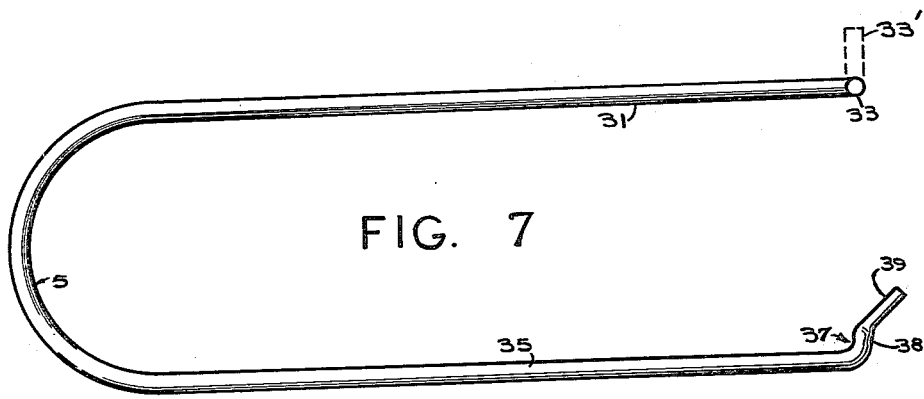
FIG. 7 is a plan view of a bail, the dotted lines showing a final bent position of one end part thereof.

Referring now particularly to FIGS. 1 and 2, there is shown at numeral 1 an inner wedge member (see also FIGS. 3 and 4); at numeral 3 an outer wedge member (see also FIGS. 5 and 6); and at numeral 5 a bail member (see also FIG. 7). The inner wedge member (FIGS. 3 and 4) consists of a stamped sheet-metal member formed into a U-shape in cross section and having an upwardly bulged channel bottom 7. The bottom is flanked by sloping side walls 9, the upper edges of which taper, as shown at 11.

At their shallowest portions, the sloping walls 9 are notched, as shown at 13, where they converge and are folded as at 2 to form two flat opposed contacting ears or sheets 15, which together form plate means. On the fold line 2 is an entrance opening 4. The ears are formed with transverse opposed semi-circular portions 17 which together define a cylindrical bearing formed opening 19 extending coaxially with opening or hole 4, for example, slightly in excess of ⅛ inch in diameter. The purpose of the portions 17 forming the opening 19 is to form a bearing. A slot 21 that is generally parallel to the axis of the wedge clamp body is formed in the ears 15. This slot has its entrance at the edge of ears 15 adjacent notch 13 and extends toward but terminates short of the portion of ears 15 overlying cylindrical opening 19. Slot 21, including its bounding surfaces on ears 15, comprises slotted catch means 22. The width of slot 21 may for example be slightly greater than ⅛ inch. Thus openings 4 and 19 form a bearing transverse to the length of wedge 1. Slot 21 is transverse to openings 4 and 19.

The outer wedge member 3 (FIGS. 5 and 6) is also of U-shape, having a downwardly bulged channel bottom 23. Gripping parts 25 are formed in channel bottom 23, substantially throughout its length. The sides 27 of member 3 also slope as shown in FIG. 6, and are wedge-shaped in an axial direction. Their outer margins are terminated by inwardly hooked flanges 29 adapted to receive them under the tapered margins of the inner wedge member 1.

The members 1 and 3 may be brought together by inserting the narrow portions of member 1 into the wider end portion of member 3 and then, telescoping them axially, whereupon, in the absence of a conductor, they will take up the assembled positions shown in FIGS. 1 and 2. In this movement, the parts 15, 17 of wedge member 1 move through the space between the flanges 29 of wedge member 3.

The bail (FIG. 7) is formed of a resilient rod or wire approximately ⅛ inch in diameter, the loop being of generally U-shape as shown. One leg 31 of the loop is initially bent transversely out of the plane of the U-shape as shown at 33. The other leg 35 is bent to form elbow latch 37, lying approximately in the plane of the U-shape. Forearm 38 of elbow latch 37 lies at about 90 degrees with the long shank portion of bail leg 35, and it terminates in enlarged tail member 39, which extends diagonally away from forearm 38 substantially in the plane of the U-shape and in the general direction of the wedge portions of an assembled clamp. Enlarged tail member 39 may take various forms, but the simplest is provided by flattening the end of bail arm 35 and bending it in the form described above and best illustrated in FIGS. 7 and 9. It will be noted that the flattening of enlarged portion 39 is so accomplished that the planes of the flattened sides are approximately perpendicular to the plane of the U-shape of bail 5 (see FIG. 7). It is important that the width of the flattened portion comprising tail 39 be greater than the width of slot 21 since a primary purpose of tail 39 is to restrain the passage of the bail 5 through the slot 21, as will be more fully explained herebelow.

Assembly is accomplished by inserting the bent portion 33 of the bail 5 into the hole 19 before it is again bent to form part 33'. After insertion of journal part 33 in the bearing 19 and angular bending of part 33', the latter along with the angular part 31 maintains the bail in assembled rotary and proper axial position in the bearing 19 and with respect to the inner wedge member.

The assembly with the leg 31 of the loop on one side of the assembled wedge members 1 and 3 allows the other leg 35 of the bail loop to be sprung over the inner wedge member 1 over notch 13, as shown in FIG. 1. It then springingly engages the assembly of ears 15, along a portion of bail leg 35 adjacent elbow latch 37, and will remain in this position until freed for installation. The result is a compact bundle of parts which are self-protective against entanglement with other like assemblies during shipment. Heretofore, bails on wedge clamps tended to become entangled with one another during shipment, causing considerable exasperation in untangling them preparatory to installation. In this position the bail also prevents wedge 3 from escaping to the right from wedge 1. Thus wedge 3 is held captive on wedge 1. To insure that bail 5 stays in such captive position, the bail leg 35 may be positioned on ears 15 so as to ride partially into the mouth of slot 21 (see FIG. 2).

Figure 8:
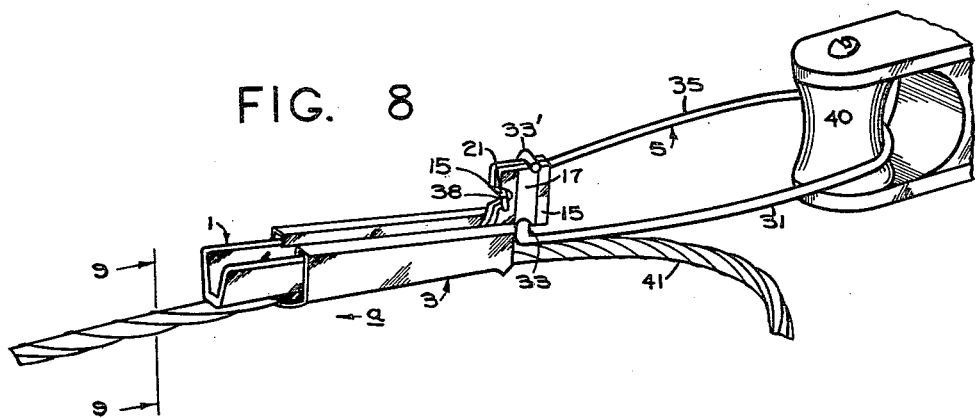
FIG. 8 is a perspective view showing the wire clamp installed in connection with a wire conductor and a supporting insulator bracket; and, FIG. 9 is a cross section viewed on line 9—9 of FIG. 8.
Figure 9:
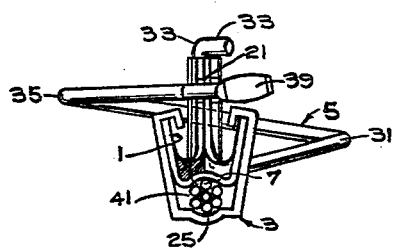

Installation is illustrated in FIGS. 8 and 9, wherein the leg 35 of the bail has been removed from behind the ears 15 and leg 31 pivoted on journal 33 in the hole 19. This places the bail in extended position. The wedge members 1 and 3 may then be separated by telescoping them in opposite directions. Bail 5 is then looped about an appropriate support, such as, for example, an insulator bracket as illustrated at 40. The bail 5 is then grasped with the portions of bail legs 31 and 35 that extend outwardly from the support about which the bail is looped in one hand and they are squeezed together. The small force thus applied moves leg 35 inward and brings enlarged tail 39 into contact with the side of ear 15. The bail is so configured and oriented with respect to the wedge member 1 that tail 39 is aligned with slot 21. Further pressure applied by squeezing the bail arms 31 and 35 together causes tail 39, which meets the surface of ears 15 at an acute angle, to slide along the contact surfaces of ears 15, riding along those ear surfaces which lie adjacent slot 21 as the free end of bail 35 travels inwardly toward the wedge members. The travel of the free bail end 35 continues until enlarged tail 39 has moved on past the sides of slot 21, at which time the forearm 38 of elbow latch 37, being of smaller diameter than the width of slot 21, moves into the entrance of slot 21 and springs rearward, along with the other portions of bail arm 35, riding to the rear of the slot under the bias set up in the resilient bail by the squeezing action just previously applied it. The tail portion 39 traps the elbow latch 37 within the slot catch means 22 and the bail is securely latched. It will be readily understood that the force applied to the wedge clamp while in service acts in a direction that tends to pull the elbow latch into tighter engagement with the slot catch 21.

Next the conductor 41 to be supported is laid up into the upwardly bulged channel bottom 7 of the inner wedge member 1. Then the large end of the wedge member 3 is first brought into engagement with the narrower portions of the tapered margins 11. At this time the member 3 underlies the conductor. Then by axially telescoping the member 3 back in the axis shown by the dart *a* in FIG. 8, the wire will be wedgingly held as the upper sloping edges 11 of the side walls 9 of member 1 become engaged under the hooked members 29 of the member 3. The result is that the conductor 41 becomes engaged on its top by the channel bottom 7 of member 1 and on its bottom by the parts 25. Since the parts form grips in a direction to hold the conductor 41 in response to any tendency for it to pull out from the wedges, such pull tends to move the member 3 into tight wedging engagement with the member 1. Reaction is provided by the portions 33 and 38 of the bail in the hole 19 and slot 21, respectively.

It will be observed that the lower end of the hole 19 is close to the place where the conductor 41 emerges from the assembly of wedge members 1 and 3. Thus the pull from conductor 41 and the reaction from leg 31 of the bail 5 are in fairly close alignment, approaching the ideal condition for minimum distortion of the wedge clamp parts under heavy loads without deforming any portions of the wedge clamp to the extent that it would become inoperative upon reuse. The resulting re-usability of the clamp is one of its advantages.

The method of installation described above contemplates first emplacing and securing the wedge clamp to support 40, followed by the engagement of the cable by the members 1 and 3; however, if desired, and in certain cases, it is advantageous, engagement of the members 1 and 3 by the cable may be first accomplished, followed by emplacement and securing of the wedge clamp to support 40.

In order to demount the wedge clamp for re-use, the sequence of events above described is reversed, the wedge members 1 and 3 being initially loosened one from the other by pushing the conductor 41 in a direction which is opposite to that shown by the dart *a*. This tends incipiently to loosen the wedge member 3 from the wedge member 1, after which they may be readily telescoped from one another.

It will be readily appreciated that an important advantage of the invention is that the attachment between the elbow latch 37 of leg 35 of the bail 5 with slot catch means 22 in ears 15, while very secure, at the same time may be readily accomplished. Also, the amount of material required for construction is minimized, there being only three moving parts, all of which may be constructed by simple punching and forming operations. Part 1 is preferably made of stainless steel or heat treated aluminum and part 3 of heat treated aluminum.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a cable wedge clamp having an elongated inner wedge member and a channeled outer wedge member complementally receiving said inner wedge member with the cable wedged between and supported by said members, the combination with said members of:

a resilient, generally U-shaped bail having a pair of opposed legs in normal spaced relationship, one of said legs having a bent portion on the outer extremity thereof extending away from the major plane of said bail, there being an elongated latch element secured at one end thereof to the outer extremity of the other leg and extending generally toward said one leg; and a securing plate carried by one of said members and provided with journal means thereon receiving the bent portion of said one leg for rotatably mounting the bail on said plate to permit shifting movement of the latter from a stored position with the bail being disposed along and adjacent said members to an operative position with the bail extending outwardly and away from said members, said plate being provided with a latch element receiving slot extending thereinto from one edge thereof, there being an enlarged portion on the latch element adjacent the opposite end thereof and engageable with said plate adjacent the margin thereof forming said slot to retain said latch element in said slot when said bail is in said operative position and said legs are spaced apart a distance less than the normal spacing of the legs.

2. A cable wedge clamp as set forth in claim 1, wherein said slot extends into said plate substantially transverse to the axis of rotation of said bent portion, said edge of said plate being positioned adjacent the junction of said plate and said one member.

3. A cable wedge clamp as set forth in claim 1, wherein said latch element includes a forearm secured to said other leg and extending therefrom substantially in the plane of said bail, said enlarged portion having a flattened end provided with a transverse width greater than the transverse width of said slot for engaging said plate on opposed sides of the slot to thereby retain said forearm therewithin.

References Cited in the file of this patent

UNITED STATES PATENTS

| | | |
|---|---|---|
| 1,948,845 | DeRight | Feb. 27, 1934 |
| 2,203,066 | Schultz | June 4, 1940 |
| 2,986,418 | Jugle | May 30, 1961 |